(12) United States Patent
Yabuuchi et al.

(10) Patent No.: US 10,202,298 B2
(45) Date of Patent: Feb. 12, 2019

(54) POLARIZING GLASS PLATE AND METHOD FOR MANUFACTURING SAME, POLARIZING GLASS PLATE SET FOR OPTICAL ISOLATOR, AND METHOD FOR MANUFACTURING OPTICAL ELEMENT FOR OPTICAL ISOLATOR

(71) Applicant: Nippon Electric Glass Co., Ltd., Shiga (JP)

(72) Inventors: Kouichi Yabuuchi, Shiga (JP); Tomoaki Kawamura, Shiga (JP); Hirokazu Takeuchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 49 days.

(21) Appl. No.: 15/321,320

(22) PCT Filed: Jun. 17, 2015

(86) PCT No.: PCT/JP2015/067419
§ 371 (c)(1),
(2) Date: Dec. 22, 2016

(87) PCT Pub. No.: WO2015/198934
PCT Pub. Date: Dec. 30, 2015

(65) Prior Publication Data
US 2017/0174547 A1    Jun. 22, 2017

(30) Foreign Application Priority Data

Jun. 26, 2014 (JP) .................................. 2014-131417
Aug. 8, 2014 (JP) .................................. 2014-162493

(51) Int. Cl.
C03B 17/06    (2006.01)
C03B 32/00    (2006.01)
(Continued)

(52) U.S. Cl.
CPC ............ *C03B 17/06* (2013.01); *C03B 23/037* (2013.01); *C03C 3/04* (2013.01); *C03C 3/11* (2013.01);
(Continued)

(58) Field of Classification Search
None
See application file for complete search history.

(56) References Cited

U.S. PATENT DOCUMENTS 5,840,096 A  * 11/1998  Tajima ................. C03B 23/037
                                                       75/334
2001/0017741 A1  8/2001  Tamaru et al.
(Continued)

FOREIGN PATENT DOCUMENTS

JP    7-14402       3/1995
JP    08-021914     1/1996
(Continued)

OTHER PUBLICATIONS

WO2011122500A1—Google Patents Machine Translation, Performed on May 9, 2018. (Year: 2018).*

(Continued)

*Primary Examiner* — Lisa L Herring
(74) *Attorney, Agent, or Firm* — Wenderoth, Lind & Ponack, L.L.P.

(57) ABSTRACT

A method of manufacturing a polarizing glass sheet includes subjecting, while heating, a glass preform sheet containing metal halide particles to down-drawing, to thereby provide a glass member having stretched metal halide particles dispersed in an aligned manner in a glass matrix, and subjecting the glass member to reduction treatment to reduce the stretched metal halide particles, to thereby provide a polarizing glass sheet. A shape of the glass preform sheet during the down-drawing satisfies a relationship of the following expression:

(Continued)

$L_1/W_1 \geq 1.0$ where $L_1$ represents a length between a portion in which a width of the glass preform sheet has changed to 0.8 times an original width and a portion in which the width of the glass preform sheet has changed to 0.2 times the original width $W_0$, and $W_1$ represents a length equivalent to 0.5 times the original width $W_0$ of the glass preform sheet.

10 Claims, 8 Drawing Sheets

(51) Int. Cl.
    *C03C 14/00*     (2006.01)
    *C03C 3/11*     (2006.01)
    *C03C 3/04*     (2006.01)
    *C03C 4/00*     (2006.01)
    *G02B 5/30*     (2006.01)
    *G02B 27/28*     (2006.01)
    *C03B 23/037*     (2006.01)

(52) U.S. Cl.
    CPC ............... *C03C 4/00* (2013.01); *C03C 14/00* (2013.01); *C03C 14/004* (2013.01); *C03C 14/006* (2013.01); *G02B 5/30* (2013.01); *G02B 5/3041* (2013.01); *G02B 5/3058* (2013.01); *G02B 27/28* (2013.01); *C03B 32/00* (2013.01); *C03C 2203/52* (2013.01); *C03C 2214/04* (2013.01); *C03C 2214/08* (2013.01); *C03C 2214/16* (2013.01); *C03C 2214/30* (2013.01); *Y02P 40/57* (2015.11)

(56) References Cited

U.S. PATENT DOCUMENTS

| | | | |
|---|---|---|---|
| 2006/0179882 A1* | 8/2006 | Ichimura | ............... C03B 23/037 65/32.3 |
| 2006/0252628 A1 | 11/2006 | Ichimura et al. | |
| 2007/0153383 A1 | 7/2007 | Borrelli et al. | |

FOREIGN PATENT DOCUMENTS

| | | |
|---|---|---|
| JP | 9-80355 | 3/1997 |
| JP | 2001-64030 | 3/2001 |
| JP | 2001-091900 | 4/2001 |
| JP | 2001-209008 | 8/2001 |
| JP | 2006-313343 | 11/2006 |
| JP | 2007-193327 | 8/2007 |
| JP | 4685901 | 5/2011 |
| WO | 2011/122500 | 10/2011 |

OTHER PUBLICATIONS

International Preliminary Report on Patentability and Written Opinion of the International Searching Authority dated Dec. 27, 2016 in International (PCT) Application No. PCT/JP2015/067419.
International Search Report dated Sep. 1, 2015 in International (PCT) Application No. PCT/JP2015/067419.

* cited by examiner

POLARIZING GLASS PLATE AND METHOD FOR MANUFACTURING SAME, POLARIZING GLASS PLATE SET FOR OPTICAL ISOLATOR, AND METHOD FOR MANUFACTURING OPTICAL ELEMENT FOR OPTICAL ISOLATOR

TECHNICAL FIELD

The present invention relates to a polarizing glass sheet to be used for an optical isolator and a method of manufacturing the polarizing glass sheet, a polarizing glass sheet set for an optical isolator using the polarizing glass sheet, and to a method of manufacturing an optical element for an optical isolator.

BACKGROUND ART

In the field of optical communication, a polarizing glass sheet is used for a polarization-dependent optical isolator. The optical isolator is a device configured to transmit oscillation light from a laser diode (LD) or the like only in one direction and block reflected return light, and includes an optical element in which a Faraday rotator (e.g., a garnet single crystal film) is held by two polarizing glass sheets, and a magnetic member (magnet) configured to apply a magnetic field to the optical element.

In order to meet recent market needs, for the purposes of supporting downsizing and reducing cost by simplifying steps, there has been adopted a manufacturing method for the optical isolator involving bonding a Faraday rotator measuring, for example, about 10 mm square and polarizing glass sheets each having substantially the same dimensions as those of the Faraday rotator to each other, to thereby manufacture a large optical element (optical element base material), and cutting the optical element into chips (optical elements) each measuring from 0.5 mm square to 2.0 mm square.

The polarizing glass sheet has a structure in which stretched metal particles of silver, copper, or the like are dispersed in an aligned manner in a glass matrix. It has been known that when light that vibrates in various directions enters the polarizing glass sheet, a transmitted quantity of the light may vary depending on the vibration direction. For example, light that vibrates in a direction parallel to the stretching direction of the stretched metal particles is easily absorbed by the stretched metal particles, and the transmitted quantity thereof becomes a minimum. Meanwhile, light that vibrates in a direction perpendicular to the stretching direction of the stretched metal particles is not easily absorbed by the stretched metal particles, and the transmitted quantity thereof becomes maximum. The ratio between the maximum quantity and the minimum quantity of light that is transmitted through the polarizing glass sheet is called an extinction ratio. As the extinction ratio increases, the polarizing glass sheet is more excellent in characteristics.

In general, the polarizing glass sheet is manufactured as described below. First, a raw material batch containing a metal element, such as silver or copper, and a halogen element is prepared, and the raw material batch is melted and formed, to thereby manufacture a glass sheet. The obtained glass sheet is subjected to heating treatment to precipitate metal halide particles in the glass sheet, to thereby provide a glass preform sheet. The glass preform sheet is subjected to down-drawing while being heated, to thereby provide a glass member having stretched metal halide particles dispersed in an aligned manner in a glass matrix. Further, the glass member is subjected to reduction treatment to reduce the stretched metal halide particles into stretched metal particles, to thereby provide a polarizing glass sheet (for example, Patent Literature 1).

In the above-mentioned manufacturing method, an angle variation (hereinafter sometimes referred to as "polarizing axis deviation") is liable to occur between respective stretched metal halide particles. Specifically, an angle of the stretched metal halide particles is liable to tilt gradually from a direction parallel to a down-drawing direction from a center portion to both end portions in a width direction of the glass member obtained by down-drawing of the glass preform sheet. When the polarizing axis deviation increases, an in-plane variation of the extinction ratio of the polarizing glass sheet is liable to increase. Therefore, when a large optical element is manufactured and cut as described above, a variation in extinction ratio between the respective chips increases, and in some cases, a defective chip that has not reached a desired extinction ratio is generated, with the result that there is a risk in that a yield may decrease.

In order to suppress the polarizing axis deviation in the polarizing glass sheet, various methods have been proposed. In Patent Literature 2, there is disclosed a method involving repeating a plurality of times the step of deforming the glass preform sheet in a predetermined direction by applying a load under a state in which the glass preform sheet is heated to be softened from a direction different by 180°. Further, in Patent Literature 3, there is disclosed a method involving appropriately adjusting the movement speed of the glass preform sheet and the take-up speed of the stretched glass sheet.

CITATION LIST

Patent Literature 1: JP 2001-64030 A
Patent Literature 2: WO 2011/122500 A1
Patent Literature 3: JP 4685901 B2

SUMMARY OF INVENTION

Technical Problem

In the method disclosed in Patent Literature 2, the steps are complicated, and the manufacturing cost is liable to increase. Meanwhile, the method disclosed in Patent Literature 3 can be performed relatively easily, but the effect of reducing polarizing axis deviation is insufficient.

In view of the foregoing, a first aspect of the present invention is to provide a method of easily manufacturing a polarizing glass sheet having reduced polarizing axis deviation.

Further, as the polarizing glass sheet to be used for manufacturing an optical isolator, two kinds of polarizing glass sheets, that is, a first polarizing glass sheet in which the alignment direction of stretched metal particles is parallel to one side of the polarizing glass sheet (angle of 0° with respect to one side), and a second polarizing glass sheet in which the alignment direction of the stretched metal particles forms an angle of 45° with respect to one side are used as a set. Further, a functional film, e.g., a reflection preventing film, may be formed on an incident surface/output surface of the polarizing glass sheet.

However, when the optical isolator is manufactured, there is a problem in that it is difficult to distinguish between the front and the back of the polarizing glass sheet or distinguish between the first polarizing glass sheet and the second polarizing glass sheet. When the polarizing glass sheets are used in wrong directions or in an incorrect combination, an optical isolator having desired characteristics cannot be obtained. Therefore, hitherto, it has been necessary to pay utmost attention to lot management and the like when manufacturing an optical isolator.

A second aspect of the present invention is to provide a method of manufacturing a polarizing glass sheet, a polarizing sheet set for an optical isolator, and an optical element for an optical isolator using the polarizing glass sheet and the polarizing sheet set for an optical isolator, in which the front and the back of the polarizing glass sheet or the first polarizing glass sheet and the second polarizing glass sheet can be easily distinguished from each other, and the manufacturing load of the optical isolator can be reduced.

Solution to Problem

<First Aspect of Present Invention>

According to one embodiment of the present invention, there is provided a method of manufacturing a polarizing glass sheet having stretched metal particles dispersed in an aligned manner in a glass matrix, the method comprising:

a down-drawing step of subjecting, while heating, a glass preform sheet having a predetermined width $W_0$ and containing metal halide particles to down-drawing, to thereby provide a glass member having stretched metal halide particles dispersed in an aligned manner in a glass matrix; and a reduction step of subjecting the glass member to reduction treatment to reduce the stretched metal halide particles, to thereby provide a polarizing glass sheet, the down-drawing step of the glass preform sheet comprising subjecting, while heating, the glass preform sheet to down-drawing so that a shape of the glass preform sheet during the down-drawing satisfies a relationship of the following expression (1).

$$L_1/W_1 \geq 1.0 \tag{1}$$

In the expression, $L_1$ represents a length between a portion in which a width of the glass preform sheet has changed to 0.8 times an original width $W_0$ and a portion in which the width of the glass preform sheet has changed to 0.2 times the original width $W_0$, and $W_1$ represents a length equivalent to 0.5 times the original width $W_0$ of the glass preform sheet.

Investigations made by the inventors of the present invention have found that when, in the down-drawing step of the glass preform sheet, the glass preform sheet is controlled so as to have the above-mentioned shape between the portion in which the width of the glass preform sheet has changed to 0.8 times the original width $W_0$ to the portion in which the width of the glass preform sheet has changed to 0.2 times the original width $W_0$ (softened and deformed portion), the stretched metal halide particles, and further the stretched metal particles are easily aligned in the down-drawing direction, and the polarizing axis deviation can be reduced.

In the method of manufacturing a polarizing glass sheet according to the embodiment of the present invention, it is preferred that $L_1$ in the expression (1) have a value of 60 mm or more.

According to another embodiment of the present invention, there is provided a method of manufacturing a polarizing glass sheet having stretched metal particles dispersed in an aligned manner in a glass matrix, the method comprising:

a down-drawing step of subjecting, while heating, a glass preform sheet having a predetermined width $W_0$ and containing metal halide particles to down-drawing, to thereby provide a glass member having stretched metal halide particles dispersed in an aligned manner in a glass matrix; and a reduction step of subjecting the glass member to reduction treatment to reduce the stretched metal halide particles, to thereby provide a polarizing glass sheet, the down-drawing step of the glass preform sheet comprising subjecting, while heating, the glass preform sheet to down-drawing so that a shape of the glass preform sheet during the down-drawing satisfies a relationship of the following expression (2).

$$L_2/W_1 \geq 0.5 \tag{2}$$

In the expression, $L_2$ represents a length between a portion in which a width of the glass preform sheet has changed to 0.8 times an original width $W_0$ and a portion in which the width of the glass preform sheet has changed to 0.5 times the original width $W_0$, and $W_1$ represents a length equivalent to 0.5 times the original width $W_0$ of the glass preform sheet.

In the method of manufacturing a polarizing glass sheet according to the embodiment of the present invention, it is preferred that $L_2$ in the expression (2) have a value of 30 mm or more.

In the method of manufacturing a polarizing glass sheet according to the embodiment of the present invention, it is preferred that the width $W_0$ of the glass preform sheet be 100 mm or more.

In the method of manufacturing a polarizing glass sheet according to the embodiment of the present invention, it is preferred that the heating be performed so that a viscosity of the glass preform sheet falls within a range of from $10^7$ dPa·s to $10^{11}$ dPa·s between the portion in which the width of the glass preform sheet during the down-drawing has changed to 0.8 times the original width $W_0$ and the portion in which the width of the glass preform sheet during the down-drawing has changed to 0.2 times the original width $W_0$.

When the heating temperature is decreased so that the viscosity in the softened and deformed portion of the glass preform sheet reaches $10^7$ dPa·s or more, the spheroidization of the metal halide particles is easily suppressed. Meanwhile, when the heating temperature is increased so that the viscosity of the glass preform sheet reaches $10^{11}$ dPa·s or less, the glass preform sheet is sufficiently softened and deformed, and the softened and deformed portion is easily formed into the shape of the expression (1). As described above, when the viscosity of the glass preform sheet of the softened and deformed portion is regulated within a predetermined range, the softened and deformed portion can be formed into the shape of the expression (1) while the spheroidization of the metal halide particles is suppressed, with the result that the polarizing axis deviation in the polarizing glass sheet is easily suppressed.

In the method of manufacturing a polarizing glass sheet according to the embodiment of the present invention, it is preferred that the metal comprise silver or copper.

According to another embodiment of the present invention, there is provided a polarizing glass sheet having stretched metal particles dispersed in an aligned manner in a glass matrix, which is obtained by subjecting, while heating, a glass preform sheet containing metal halide particles to down-drawing and subjecting the glass preform sheet to reduction treatment, wherein an angle variation of the stretched metal particles at a width of 8 mm in a direction perpendicular to a down-drawing direction falls within 0.0065°/mm.

In the polarizing glass sheet according to the embodiment of the present invention, it is preferred that an extinction ratio of the polarizing glass sheet in a near-infrared range be 40 dB or more.

In the polarizing glass sheet according to the embodiment of the present invention, it is preferred that an in-plane variation of an extinction ratio of the polarizing glass sheet at the width of 8 mm in the direction perpendicular to the down-drawing direction fall within ±5 dB.

In the polarizing glass sheet according to the embodiment of the present invention, it is preferred that the polarizing glass sheet have a rectangular shape.

In the polarizing glass sheet according to the embodiment of the present invention, it is preferred that the polarizing glass sheet comprise at least one cutout portion.

According to another embodiment of the present invention, there is provided a polarizing glass sheet set for an optical isolator, comprising:

a first polarizing glass sheet having stretched metal particles dispersed in an aligned manner in a glass matrix, a stretching direction of the metal particles being substantially parallel to one side; and a second polarizing glass sheet having stretched metal particles dispersed in an aligned manner in a glass matrix, a stretching direction of the metal particles forming an angle of about 45° with respect to one side, wherein the first polarizing glass sheet and the second polarizing glass sheet each comprise the above-mentioned polarizing glass sheet.

According to another embodiment of the present invention, there is provided a method of manufacturing an optical element for an optical isolator, the method comprising:

a preparation step of preparing the above-mentioned polarizing glass sheet set for an optical isolator and a Faraday rotator;

a bonding step of bonding the first polarizing glass sheet and the second polarizing glass sheet to each other through intermediation of the Faraday rotator, to thereby manufacture an optical element base material for an optical isolator; and a cutting step of cutting the optical element base material for an optical isolator, to thereby provide an optical element for an optical isolator.

According to another embodiment of the present invention, there is provided an optical element for an optical isolator, which is manufactured by the above-mentioned method.

According to another embodiment of the present invention, there is provided an optical isolator, comprising the above-mentioned optical element for an optical isolator.

According to another embodiment of the present invention, there is provided an optical isolator, comprising the above-mentioned polarizing glass sheet.

<Second Aspect of Present Invention>

According to one embodiment of the present invention, there is provided a polarizing glass sheet having a rectangular shape and having stretched metal particles dispersed in an aligned manner in a glass matrix, the polarizing glass sheet comprising at least one cutout portion. The term "cutout portion" as used herein refers to a portion obtained by cutting out a part of a glass sheet intentionally. There are no limitations on the shape, dimensions, formation position, and the like of the cutout portion.

When any one of the first polarizing glass sheet and the second polarizing glass sheet has a cutout portion through use of the above-mentioned configuration, it becomes easy to distinguish between the first polarizing glass sheet and the second polarizing glass sheet. Further, by appropriately setting the shape and the like of the cutout portion, it becomes easy to distinguish between the front surface and the back surface.

It is preferred that the polarizing glass sheet have a substantially square shape. The term "substantially square shape" as used herein is not limited to a perfect square and is intended to include a square having a variation in length of four sides to some degree due to constraints on manufacturing and the like. Specifically, the term refers to a square in which the length of each of the four sides falls within ±3% with respect to a predetermined length.

In the case of the polarizing glass sheet having the above-mentioned configuration, the effect obtained by applying the present invention is extremely remarkable.

In the embodiment of the present invention, it is preferred that the cutout portion and a polarizing glass sheet main portion have a boundary having a straight line shape or a curved shape. The term "polarizing glass sheet main portion" as used herein refers to a portion of the polarizing glass sheet excluding the cutout portion. Further, the term "curved shape" is not limited to an arc-shaped curve, and includes, for example, a parabola-shaped curve and a curved line in which a plurality of arcs having different curvatures are connected.

In the embodiment of the present invention, it is preferred that the cutout portion have a triangular shape with a corner portion of the polarizing glass sheet being one of apexes. The term "corner portion" as used herein refers to a corner portion that is present before the formation of the cutout portion and is cut out by the formation of the cutout portion.

According to the above-mentioned configuration, the cutout portion can be formed efficiently.

In the embodiment of the present invention, it is preferred that the cutout portion have a rectangular shape that shares at least one side with the polarizing glass sheet. The phrase "share one side" means that the portion cut out by the formation of the cutout portion among sides forming an outer extension part of the polarizing glass sheet forms one side of the rectangular cutout portion.

When an optical element for an optical isolator is obtained by cutting the optical element base material for an optical isolator, the optical element base material is cut parallel to each side of the optical element base material, to thereby provide a rectangular optical element. Thus, through the adoption of the above-mentioned configuration, a loss caused by cutting can be reduced.

In the embodiment of the present invention, it is preferred that the cutout portion have a shape surrounded by two adjacent sides of the polarizing glass sheet and a curved line connecting points on the two sides. The phrase "two adjacent sides of the polarizing glass sheet" refers to two adjacent sides in which apart is cut out by the formation of the cutout portion among sides forming an outer extension part of the polarizing glass sheet.

In the embodiment of the present invention, it is preferred that the cutout portion be formed so as to be positioned in a corner portion of the polarizing glass sheet. The phrase "formed so as to be positioned in a corner portion" means that the cutout portion is formed by cutting out the corner portion.

In the embodiment of the present invention, it is preferred that the cutout portion have an asymmetric shape with respect to a diagonal line of the polarizing glass sheet, which passes through the cutout portion. The phrase "diagonal line which passes through the cutout portion" refers to a diagonal line that passes through an apex of the corner portion that is present before the formation of the cutout portion (corner portion cut out by the formation of the cutout portion) among diagonal lines of the polarizing glass sheet. The phrase "an asymmetric shape with respect to a diagonal line of the polarizing glass sheet" means that, when the diagonal line is defined as an axis, the shape of the cutout portion is asymmetric with respect to the axis.

According to the above-mentioned configuration, it becomes easy to distinguish between the front surface and the back surface of the polarizing glass sheet.

In the embodiment of the present invention, it is preferred that the cutout portion be formed at a position not including the corner portion. The phrase "formed at a position not including the corner portion" means that the cutout portion is formed without cutting out a close corner portion.

According to the above-mentioned configuration, it becomes easy to distinguish between the front surface and the back surface of the polarizing glass sheet.

In the embodiment of the present invention, it is preferred that the polarizing glass sheet comprise a plurality of cutout portions, and at least two of the plurality of cutout portions have different shapes, dimensions, and/or cutout positions. The term "cutout position" refers to the position of the cutout portion when viewed from a close corner portion.

According to the above-mentioned configuration, it becomes easy to distinguish between the front surface and the back surface of the polarizing glass sheet.

In the embodiment of the present invention, it is preferred that the polarizing glass sheet further comprise a functional film formed on one surface.

In the case of the polarizing glass sheet having the above-mentioned configuration, the effect obtained by applying the present invention is extremely remarkable.

According to another embodiment of the present invention, there is provided a polarizing glass sheet set for an optical isolator, comprising:

a first polarizing glass sheet having stretched metal particles dispersed in an aligned manner in a glass matrix, a stretching direction of the metal particles being substantially parallel to one side; and a second polarizing glass sheet having stretched metal particles dispersed in an aligned manner in a glass matrix, a stretching direction of the metal particles forming an angle of about 45° with respect to one side, wherein any one of the first polarizing glass sheet and the second polarizing glass sheet is free of a cutout portion, and the other polarizing glass sheet comprises the above-mentioned polarizing glass sheet having the cutout portion. The term "polarizing glass sheet set for an optical isolator" as used herein refers to an assembly of a plurality of polarizing glass sheets including the first polarizing glass sheet and the second polarizing glass sheet.

According to the above-mentioned configuration, it becomes easy to distinguish between the first polarizing glass sheet and the second polarizing glass sheet. Further, by appropriately setting the shape and the like of the cutout portion, it also becomes easy to distinguish between the front surface and the back surface of the polarizing glass sheet.

According to another embodiment of the present invention, there is provided a polarizing glass sheet set for an optical isolator, comprising:

a first polarizing glass sheet having stretched metal particles dispersed in an aligned manner in a glass matrix, a stretching direction of the metal particles being substantially parallel to one side; and a second polarizing glass sheet having stretched metal particles dispersed in an aligned manner in a glass matrix, a stretching direction of the metal particles forming an angle of about 45° with respect to one side, wherein the first polarizing glass sheet and the second polarizing glass sheet each comprise the above-mentioned polarizing glass sheet having the cutout portion.

According to the above-mentioned configuration, by setting the shape, dimensions, cutout position, number, and the like of the cutout portions to be different, it becomes easy to distinguish between the first polarizing glass sheet and the second polarizing glass sheet. Further, by appropriately setting the shape and the like of the cutout portion, it becomes easy to distinguish between the front surface and the back surface of each polarizing glass sheet even when functional films are formed on both the first polarizing glass sheet and the second polarizing glass sheet.

In the embodiment of the present invention, it is preferred that the cutout portion formed in the first polarizing glass sheet and the cutout portion formed in the second polarizing glass sheet be different from each other in shape, dimensions, cutout position, and/or number of cutout portions.

According to the above-mentioned configuration, it becomes easy to distinguish between the first polarizing glass sheet and the second polarizing glass sheet.

According to another embodiment of the present invention, there is provided a method of manufacturing an optical element for an optical isolator, comprising:

a preparation step of preparing the above-mentioned polarizing glass sheet set for an optical isolator and a Faraday rotator;

a bonding step of bonding the first polarizing glass sheet and the second polarizing glass sheet to each other through intermediation of the Faraday rotator, to thereby manufacture an optical element base material for an optical isolator; and a cutting step of cutting the optical element base material for an optical isolator, to thereby provide an optical element for an optical isolator.

According to the above-mentioned configuration, it is easy to distinguish between a front and a back of the polarizing glass sheet or between the first polarizing glass sheet and the second polarizing glass sheet, and hence the optical element for an optical isolator can be manufactured efficiently.

In the embodiment of the present invention, it is preferred that the cutout portion formed in the polarizing glass sheet be utilized for distinguishing between the first polarizing glass sheet and the second polarizing glass sheet.

Further, in the embodiment of the present invention, it is preferred that the cutout portion formed in the polarizing glass sheet be utilized for distinguishing between a front and a back of the polarizing glass sheet.

Advantageous Effects of Invention

According to the present invention, it is possible to easily manufacture the polarizing glass sheet having reduced polarizing axis deviation.

DESCRIPTION OF EMBODIMENTS

<First Aspect of Present Invention>

Figure 1:
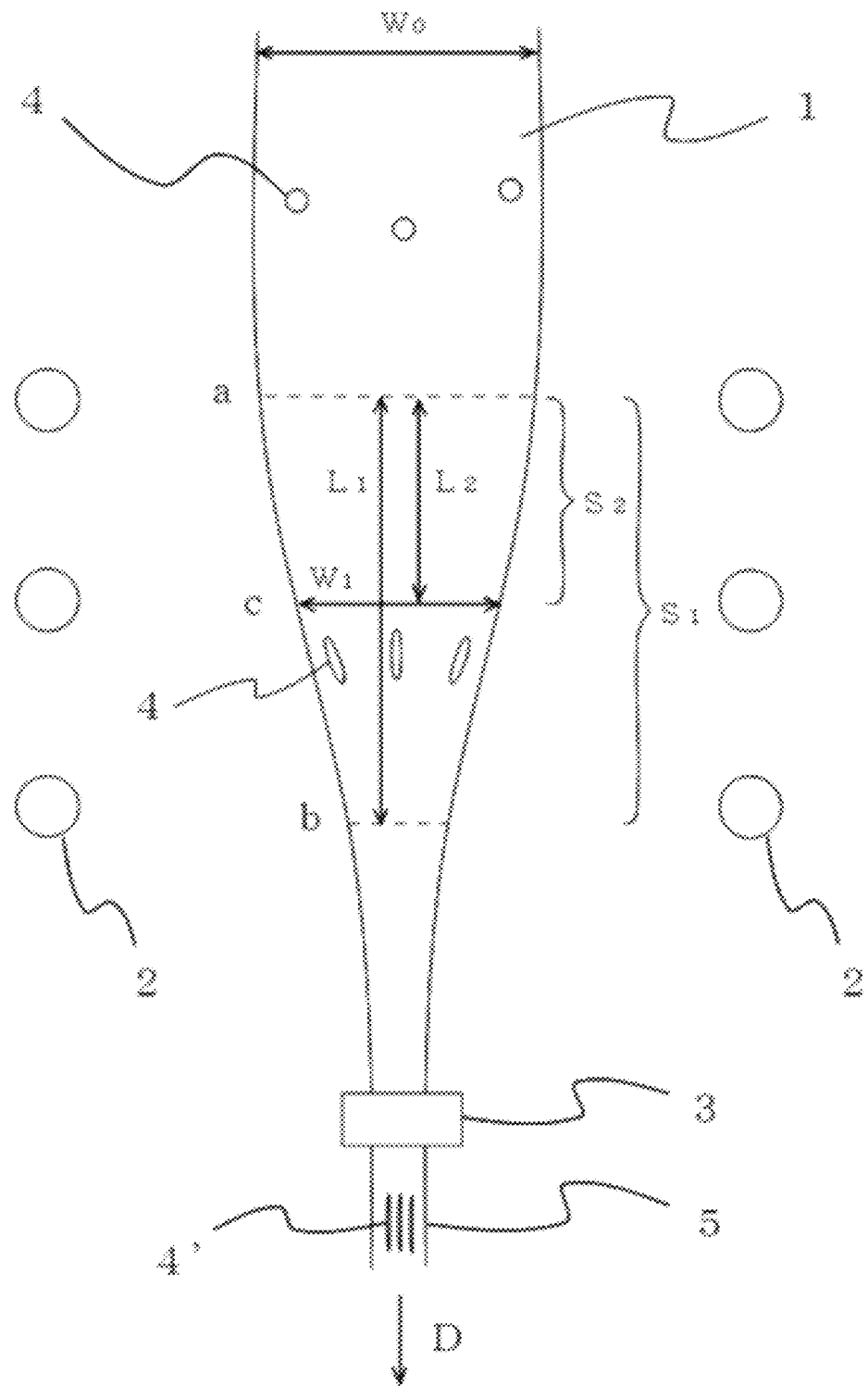
FIG. 1 is a schematic front view for illustrating a down-drawing step of a glass preform sheet according to one embodiment of the present invention.

Now, embodiments of the present invention are described in detail with reference to the drawings.

(Preparation of Glass Preform Sheet)

First, a glass preform sheet serving as a down-drawing base material is prepared. As a glass forming the glass preform sheet, a glass having a predetermined viscosity in a temperature range (e.g., 480° C. or more), in which metal halide particles are sufficiently softened and deformed in the glass, is selected. With this, the metal halide particles can be stretched to a desired length. As such glass, there is given borosilicate glass.

The glass preform sheet can be manufactured as described below. First, raw materials are blended so that a desired glass composition is obtained. In order to precipitate metal halide particles in a glass matrix in a later stage, the raw materials contain a halogen element material and a metal element material. As the halogen element, chlorine, bromine, or iodine can be used. However, iodine has a large environmental load, and hence it is preferred that chlorine or bromine be used. Further, as the metal element, it is preferred that silver or copper be used from the viewpoint that a desired extinction ratio is obtained easily. Silver bromide has a melting point lower than that of silver chloride and is liable to be spheroidized in a down-drawing step. Therefore, when silver is used as the metal particles, it is preferred that chlorine be used as the halogen element.

Next, the raw materials are melted at a predetermined temperature until the raw materials become homogeneous. Then, the molten glass is formed into a sheet. The glass formed into a sheet is subjected to heating treatment, for example, at from 600° C. to 700° C., to thereby precipitate metal halide particles in a glass matrix. There is no particular limitation on the atmosphere during heating treatment, and an air atmosphere may be used. Then, the resultant is subjected to processing, such as cutting and polishing, as necessary, to thereby provide a glass preform sheet having a predetermined width.

The width of the glass preform sheet is appropriately selected in accordance with the dimensions of an intended polarizing glass sheet. For example, the width of the glass preform sheet is preferably 2.5 times or more, more preferably 5 times or more, still more preferably 10 times or more, particularly preferably 12 times or more, most preferably 15 times or more the width of the intended polarizing glass sheet. There is no particular limitation on an upper limit. However, when the width is excessively large, the polarizing axis deviation in a polarizing glass sheet surface is liable to increase. Thus, the width of the glass preform sheet is preferably 50 times or less, more preferably 30 times or less, still more preferably 25 times or less the width of the intended polarizing glass sheet. Specifically, the width of the glass preform sheet is preferably from 100 mm to 500 mm, more preferably from 120 mm to 300 mm, still more preferably from 150 mm to 250 mm.

There is no particular limitation on the thickness of the glass preform sheet. However, when the thickness is excessively small, the mechanical strength of the polarizing glass sheet is liable to decrease. Meanwhile, when the thickness is excessively large, the thickness of the polarizing glass sheet increases, with the result that the light transmittance is liable to decrease, and the device is liable to increase in size. In view of the foregoing, the thickness of the glass preform sheet is preferably from 10 times to 50 times, more preferably from 12 times to 30 times, still more preferably from 15 times to 25 times the thickness of the intended polarizing glass sheet. Specifically, the thickness of the glass preform sheet is preferably from 0.5 mm to 10 mm, more preferably from 1 mm to 5 mm.

(Down-drawing of Glass Preform Sheet)

The glass preform sheet is subjected to down-drawing while being heated, to thereby provide a glass member having stretched metal halide particles dispersed in an aligned manner in a glass matrix. FIG. 1 is a schematic front view for illustrating a down-drawing step of the glass preform sheet according to this embodiment. A glass preform sheet 1 is heated to be softened by heat-generating elements 2 and stretched by a tension roller 3. With this, metal halide particles 4 are also stretched in a direction of a down-drawing direction D, and a glass member 5 in which stretched metal halide particles 4' are dispersed in an aligned manner in a glass matrix is obtained. In FIG. 1, the heat-generating elements 2 have a cylindrical shape and are each installed in a direction perpendicular to the drawing sheet. Further, a plurality of heat-generating elements 2 are also installed on a front surface side and a back surface side of the glass preform sheet 1 (not shown). It is preferred that each heat-generating element 2 be arranged, for example, in a tower shape.

In the down-drawing step of the glass preform sheet 1, a shape of the glass preform sheet 1 during the down-drawing satisfies a relationship of the following expression (1).

$$L_1/W_1 \geq 1.0 \qquad (1)$$

In the expression, $L_1$ represents a length between a portion a in which a width of the glass preform sheet 1 has changed to 0.8 times an original width $W_0$ and a portion b in which the width of the glass preform sheet 1 has changed to 0.2 times the original width $W_0$ (softened and deformed portion $S_1$), and $W_1$ represents a length equivalent to 0.5 times the original width $W_0$ of the glass preform sheet 1.

In the expression (1), $L_1/W_1$ is more preferably 1.2 or more, still more preferably 1.5 or more, particularly preferably 1.8 or more, most preferably 2 or more. When $L_1/W_1$ is excessively small, the polarizing axis deviation in the polarizing glass sheet is liable to increase. There is no particular limitation on an upper limit. However, when $L_1/W_1$ is excessively large, a facility is liable to increase in size. Therefore, practically, $L_1/W_1$ is preferably 10 or less, more preferably 5 or less.

The value of the length $L_1$ of the softened and deformed portion $S_1$ is appropriately selected so as to satisfy the relationship of the expression (1). Specifically, the value of $L_1$ is preferably 60 mm or more, more preferably 100 mm or more, still more preferably 120 mm or more, particularly preferably 150 mm or more. When the value of $L_1$ is excessively small, the polarizing axis deviation in the polarizing glass sheet is liable to increase.

In another embodiment of the present invention, in the down-drawing step of the glass preform sheet 1, a shape of the glass preform sheet 1 during the down-drawing satisfies a relationship of the following expression (2).

$$L_2/W_1 \geq 0.5 \quad (2)$$

In the expression, $L_2$ represents a length between a portion a in which a width of the glass preform sheet 1 has changed to 0.8 times an original width $W_0$ and a portion c in which the width of the glass preform sheet 1 has changed to 0.5 times the original width $W_0$ (softened and deformed portion $S_2$), and $W_1$ represents a length equivalent to 0.5 times the original width $W_0$ of the glass preform sheet 1.

In the expression (2), $L_2/W_1$ is more preferably 0.5 or more, more preferably 0.8 or more, particularly preferably 1.0 or more. When $L_2/W_1$ is excessively small, the polarizing axis deviation in the polarizing glass sheet is liable to increase. There is no particular limitation on an upper limit. However, when $L_2/W_1$ is excessively large, a facility is liable to increase in size. Therefore, practically, $L_2/W_1$ is preferably 20 or less, more preferably 10 or less.

The value of the length $L_2$ of the softened and deformed portion $S_2$ is appropriately selected so as to satisfy the relationship of the expression (2). Specifically, the value of $L_2$ is preferably 30 mm or more, more preferably 50 mm or more, still more preferably 60 mm or more, particularly preferably 75 mm or more. When the value of $L_2$ is excessively small, the polarizing axis deviation in the polarizing glass sheet is liable to increase.

It is only necessary that a distance between centers in the down-drawing direction D of the heat-generating element 2 in an uppermost stage and the heat-generating element 2 in a lowermost stage (hereinafter referred to as "length of a heat-generating portion") be appropriately adjusted in accordance with the width $W_0$ of the glass preform sheet 1. For example, the length of the heat-generating portion is preferably 1.5 times or more, more preferably 2 times or more, still more preferably 2.5 times or more the width $W_0$ of the glass preform sheet 1. There is no particular limitation on an upper limit. However, when the length of the heat-generating portion is excessively large, an energy loss is caused. Therefore, the length of the heat-generating portion is preferably 10 times or less, more preferably 8 times or less the width $W_0$ of the glass preform sheet 1. Specifically, the length of the heat-generating portion is preferably from 250 mm to 1,000 mm, more preferably from 300 mm to 800 mm or more, still more preferably from 400 mm to 800 mm.

The glass preform sheet 1 is heated so that the viscosity thereof reaches preferably from $10^7$ dPa·s to $10^{11}$ dPa·s, more preferably from $10^8$ dPa·s to $10^{10}$ dPa·s, still more preferably from $10^{8.5}$ dPa·s to $10^{9.5}$ dPa·s in the softened and deformed portion $S_1$ of the glass preform sheet 1. When the viscosity of the glass preform sheet 1 in the softened and deformed portion $S_1$ is excessively low, the viscosity of the metal halide particles 4 also decreases, and the metal halide particles 4 are spheroidized, with the result that the stretched metal halide particles 4' having a desired length are not likely to be obtained. Meanwhile, when the viscosity of the glass preform sheet 1 in the softened and deformed portion $S_1$ is excessively high, the glass preform sheet 1 is not sufficiently softened and deformed, and the shape thereof during the down-drawing is less likely to satisfy the relationship of the expression (1). Further, in some cases, there is a risk in that the glass preform 1 may be broken.

(Reduction of Glass Member)

The glass member 5 obtained as described above is subjected to reduction treatment to reduce the stretched metal halide particles 4', to thereby provide stretched metal particles. The reduction treatment is performed by heating, for example, in a hydrogen atmosphere. In general, it is only necessary that only the stretched metal halide particles 4' located in a surface layer (for example, depth of from 10 μm to 100 μm, further from 20 μm to 80 μm) of the glass member 5 be reduced to be changed to the stretched metal particles.

The extinction wavelength range of the polarizing glass sheet varies depending on the length of the stretched metal particles. Therefore, it is only necessary that the length of the stretched metal particles be appropriately adjusted in accordance with an intended extinction wavelength range. The length of the stretched metal particles is appropriately adjusted within a range of, for example, from 50 nm to 300 nm, further from 80 nm to 200 nm. Further, the aspect ratio of the stretched metal particles is appropriately adjusted within a range of, for example, from 5 to 20, further from 8 to 15.

The glass member 5 subjected to the reduction treatment is subjected to processing, such as cutting, to thereby provide a polarizing glass sheet having desired dimensions. As necessary, a functional film, such as a reflection preventing film formed of a dielectric multi-layer film, may be formed on the surface of the polarizing glass sheet.

(Polarizing Glass Sheet)

The dimensions of the polarizing glass sheet measure, for example, preferably 5 mm square or more, more preferably 10 mm square or more, still more preferably 15 mm square or more, particularly preferably 20 mm square or more. As described above, in recent years, a manufacturing method involving manufacturing a large optical isolator through use of a large polarizing glass sheet and a Faraday rotator and cutting the optical isolator into chips each measuring from 0.5 mm square to 2.0 mm square has been adopted. Therefore, as the polarizing glass sheet becomes larger, mass manufacturing can be achieved, with the result that cost can be reduced. However, when the polarizing glass sheet is excessively large, the in-plane polarizing axis deviation increases, and a yield is liable to decrease. Therefore, the dimensions of the polarizing glass sheet measure preferably 40 mm square or less, more preferably 30 mm square or less.

There is no particular limitation on the thickness of the polarizing glass sheet. However, when the thickness is excessively small, the mechanical strength of the polarizing glass sheet is liable to decrease. Meanwhile, when the thickness is excessively large, the light transmittance is liable to decrease, and the device is liable to increase in size. In view of the foregoing, the thickness of the polarizing glass sheet is preferably from 0.05 mm to 1 mm, more preferably from 0.1 mm to 0.5 mm.

In a direction perpendicular to the down-drawing direction D, the angle variation (polarizing axis deviation) of the stretched metal particles at the width of 8 mm of the polarizing glass sheet falls within preferably 0.0065°/mm, more preferably 0.0060°/mm, still more preferably 0.0055°/mm, particularly preferably 0.0050°/mm. When the polarizing axis deviation of the polarizing glass sheet is excessively large, the extinction ratio variation in the polarizing glass sheet surface is liable to increase, and a yield is liable to decrease.

The extinction ratio of the polarizing glass sheet is preferably 40 dB or more, more preferably 45 dB or more, still more preferably 50 dB or more at a wavelength of 1,310 nm and/or 1,550 nm of an infrared laser. The extinction ratio is calculated by the expression (3).

$$\text{Extinction ratio (dB)} = 10 \times \log_{10}(P_1/P_2) \qquad (3)$$

$P_1$=Maximum quantity of transmitted light
$P_2$=Minimum quantity of transmitted light The in-plane variation of the extinction ratio of the polarizing glass sheet at the width of 8 mm in a direction perpendicular to the down-drawing direction falls within preferably ±5 dB, more preferably ±3 dB, still more preferably ±2.5 dB, particularly preferably ±2 dB.

The polarizing glass sheet obtained as described above is used as an optical isolator by being bonded to a Faraday rotator having substantially the same dimensions. Specifically, two polarizing glass sheets are bonded to each other so as to hold the Faraday rotator, and the resultant is used as an optical isolator by being cut to desired dimensions (e.g., from 0.5 mm square to 2.0 mm square) as necessary. In order to enhance performance, an optical isolator may be manufactured by alternately stacking a plurality of Faraday rotators and three or more polarizing glass sheets.

<Second Aspect of Present Invention>

The polarizing glass sheet of the present invention has a configuration in which stretched metal particles are dispersed in an aligned manner in a glass matrix. The polarizing glass sheet can be classified into two kinds depending on the stretching direction of the metal particles. That is, there are a polarizing glass sheet (first polarizing glass sheet) in which the stretching direction of the metal particles is substantially parallel to one side, and a polarizing glass sheet (second polarizing glass sheet) in which the stretched metal particles are dispersed in an aligned manner in a glass matrix and the stretching direction of the metal particles forms an angle of about 45° with respect to one side. In the second aspect of the present invention in this description, unless otherwise stated, the simple term "polarizing glass sheet" refers to both the first and second polarizing glass sheets.

The polarizing glass sheet of the present invention has a rectangular shape. In particular, it is preferred that the polarizing glass sheet have a substantially square shape.

The polarizing glass sheet of the present invention comprises one or more cutout portions. There is no particular limitation on the shape of a boundary line between the cutout portion and the non-cutout portion, which characterizes the form of the cutout portion. From the viewpoint of the ease of forming the cutout portion, it is preferred that the boundary line therebetween have a straight line shape or a curved shape. When the boundary line has a curved shape, it is desired that the curved shape be an arc-shaped curve from the viewpoint of the ease of processing.

Through arrangement of the cutout portion, it becomes possible to distinguish between the first polarizing glass sheet and the second polarizing glass sheet based on the presence or absence of the cutout portion, the difference in features of the cutout portions, and the like. As the shape of the cutout portion, for example, there may be preferably given (1) a triangular shape, e.g., an isosceles right triangle or a scalene right triangle, (2) a rectangular shape, e.g., a square or a rectangle, and (3) a shape, such as a fan shape, surrounded by two adjacent sides of the polarizing glass sheet and a curved line connecting points on the two sides. Those cutout portions may be formed at any positions in the polarizing glass sheet.

Figure 3:
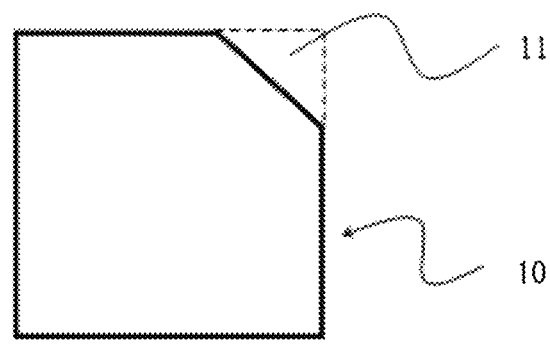
FIG. 3A is a schematic plan view for illustrating an example of a polarizing glass sheet having a cutout portion formed in a corner portion.
FIG. 3B is a schematic plan view for illustrating an example of a polarizing glass sheet having a cutout portion formed in a corner portion.
FIG. 3C is a schematic plan view for illustrating an example of a polarizing glass sheet having a cutout portion formed in a corner portion.
Figure 3:
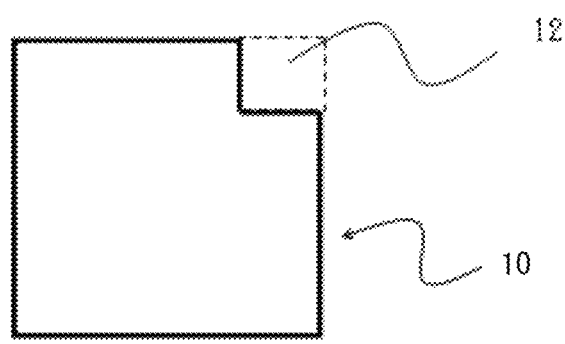
Figure 3:
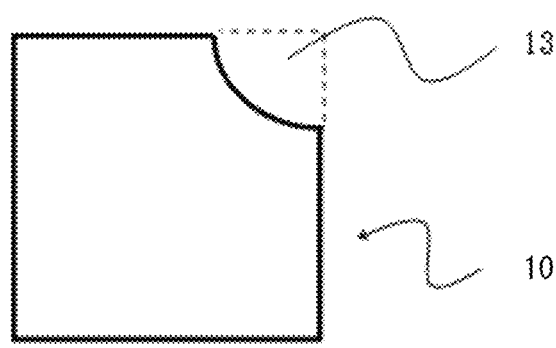

It is preferred that the cutout position be a corner portion of the polarizing glass sheet from the viewpoint of preventing chipping during cutting or handling of the polarizing glass sheet and from the viewpoint of the yield at a time when an optical element is obtained by cutting and separating an optical element base material for an optical isolator. FIGS. 3A to 3C are illustrations of examples of the polarizing glass sheet 10 having one cutout portion formed in a corner portion. FIG. 3A is an illustration of the polarizing glass sheet 10 having one cutout portion 11 in an isosceles right triangle shape. FIG. 3B is an illustration of the polarizing glass sheet 10 having one cutout portion 12 in a square shape. FIG. 3C is an illustration of the polarizing glass sheet having one cutout portion 13 in a fan shape.

Figure 4:
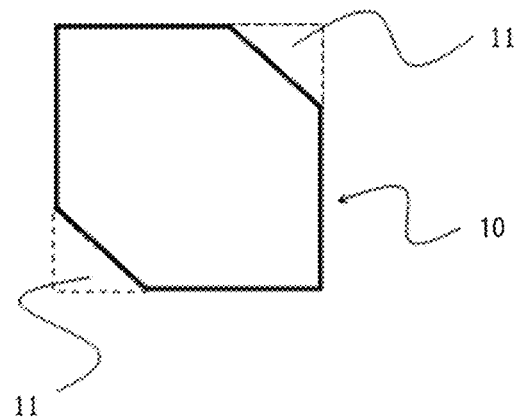
FIG. 4 is a schematic plan view for illustrating an example of a polarizing glass sheet having a plurality of cutout portions.

The number of the cutout portions is not limited to one, and a plurality of cutout portions 11, 11 may be formed as illustrated in FIG. 4.

The front and the back of the polarizing glass sheet of the present invention can be distinguished from each other by appropriately setting the feature of the cutout portion.

Figure 5:
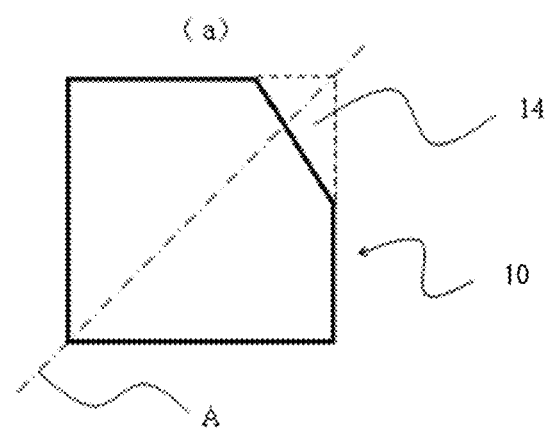
FIGS. 5A and 5B are schematic plan views for illustrating examples of a polarizing glass sheet having a cutout portion that is asymmetric with respect to a diagonal line.
Figure 5:
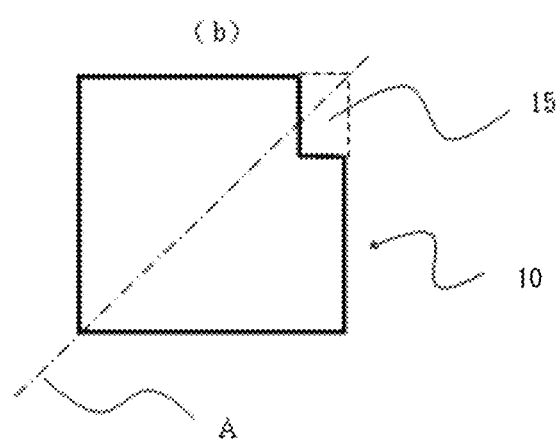
Figure 6:
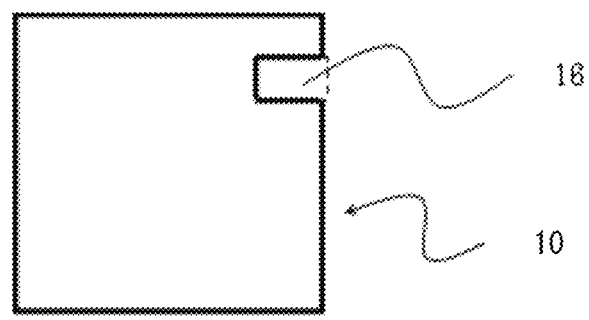
FIG. 6 is a schematic plan view for illustrating an example of a polarizing glass sheet having a cutout portion formed at a position not including a corner portion.

When the front and the back of the polarizing glass sheet are distinguished from each other through use of one cutout portion, it is only necessary that the shape and position of the cutout portion be adjusted. When the front and the back of the polarizing glass sheet are distinguished from each other based on the shape of the cutout portion, it is only necessary that the shape of the cutout portion be set to be, for example, asymmetric with respect to a diagonal line of the polarizing glass sheet, which passes through the cutout portion. FIGS. 5A to 5B are illustrations of examples of the polarizing glass sheet 10 having one cutout portion that is asymmetric with respect to a diagonal line A. FIG. 5A is an illustration of the polarizing glass sheet 10 having one cutout portion 14 in a scalene right triangle shape, and FIG. 5B is an illustration of the polarizing glass sheet 10 having one cutout portion 15 in a rectangle shape. Further, when the front and the back of the polarizing glass sheet are distinguished from each other based on the position of the cutout portion, it is only necessary that the cutout portion be formed, for example, at a position not including a corner portion of the polarizing glass sheet. FIG. 6 is an illustration of the polarizing glass sheet 10 having one cutout portion 16 in a rectangle shape formed at a position away from a corner portion.

Figure 7:
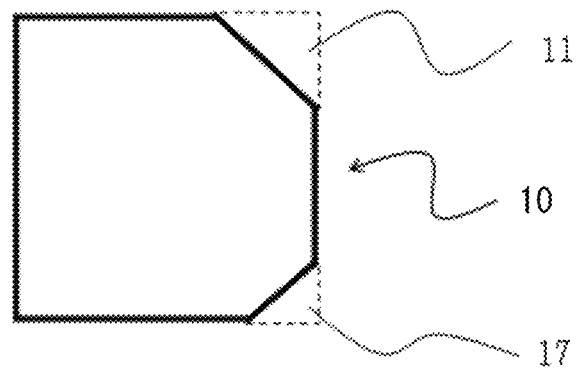
FIG. 7A is a schematic plan view for illustrating an example of a polarizing glass sheet having a plurality of cutout portions.
FIG. 7B is a schematic plan view for illustrating an example of a polarizing glass sheet having a plurality of cutout portions.
FIG. 7C is a schematic plan view for illustrating an example of a polarizing glass sheet having a plurality of cutout portions.
Figure 7:
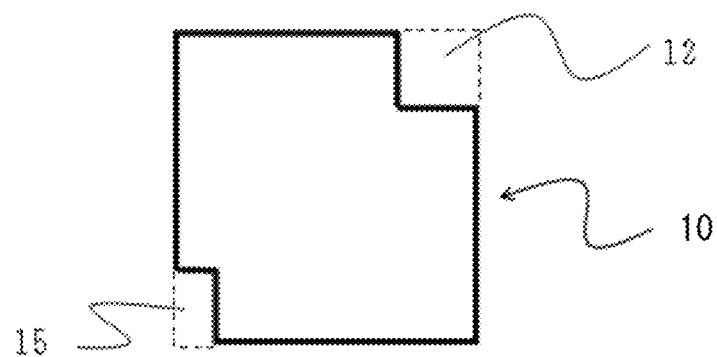
Figure 7:
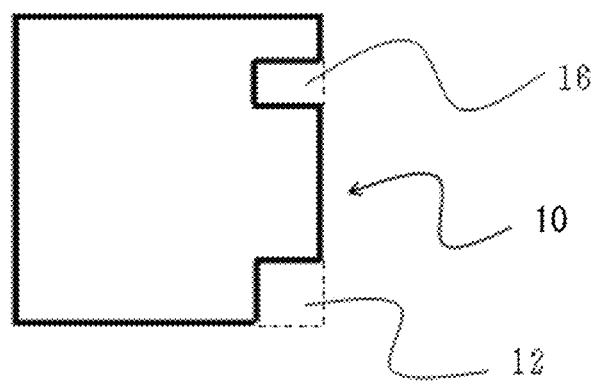

When the front and the back of the polarizing glass sheet are distinguished from each other through use of two or more cutout portions, the shape, dimensions, cutout position, and the like of the cutout portion are set to be different between the two or more cutout portions, to thereby allow the front and the back of the polarizing glass sheet to be distinguished from each other. FIGS. 7A to 7C are illustrations of examples of the polarizing glass sheet having two cutout portions. FIG. 7A is an illustration of the polarizing glass sheet 10 in which cutout portions 11 and 17 having isosceles right triangle shapes of different dimensions are formed in two adjacent corner portions. FIG. 7B is an illustration of the polarizing glass sheet 10 in which the cutout portion 12 having a square shape and the cutout portion 15 having a rectangle shape are formed in opposed corner portions. FIG. 7C is an illustration of the polarizing glass sheet 10 having the cutout portion 12 in a square shape formed in a corner portion and the cutout portion 16 in a rectangle shape formed at a position not including a corner portion.

Even when the front and the back of the glass sheet can be distinguished from each other based on only the feature of one cutout portion, the arrangement of a plurality of cutout portions is not excluded. In this case, the shape, dimensions, cutout position, and the like of the cutout portions may be set to be different or may not be set to be different.

The ratio of the area of the polarizing glass sheet main portion of the polarizing glass sheet of the present invention is preferably 94% or more, more preferably 98% or more, particularly preferably 99% or more with respect to the entire area obtained by combining the main portion and the cutout portion. A region in which the cutout portion is formed cannot be used for manufacturing an optical element for an optical isolator. Therefore, as the area excluding the cutout portion becomes smaller, the manufacturing yield of the optical element for an optical isolator decreases. Thus, it is desired that the area of a region excluding the cutout portion be set to be maximized as long as a range required for the distinction can be left.

A polarizing glass sheet set for an optical isolator of the present invention comprises a first polarizing glass sheet and a second polarizing glass sheet. The present invention comprises the case where the first and/or second polarizing glass sheets are formed of a plurality of polarizing glass sheets, as well as the case where the first polarizing glass sheet and the second polarizing glass sheet are each formed of one polarizing glass sheet.

The distinction between the first and second polarizing glass sheets through use of the cutout portion in the polarizing glass sheet set of the present invention is described below. The distinction between the front and the back of each polarizing glass sheet through use of the cutout portion is as described above, and hence the description thereof is omitted here.

For distinguishing between the first and second polarizing glass sheets through use of the cutout portion, there are the case where the cutout portion is formed in only one of the polarizing glass sheets and the case where the cutout portion is formed in both the polarizing glass sheets. The case where the cutout portion is formed in only one of the polarizing glass sheets is as described above, and hence the description thereof is omitted here.

When the cutout portion is formed in both the first and second polarizing glass sheets, it is only necessary that the shape, dimensions, cutout position, number, and the like of cutout portions be set to be different. When there is a difference in any one of the shape, dimensions, cutout position, number, and the like of cutout portions, the first polarizing glass sheet and the second polarizing glass sheet can be easily distinguished from each other. Those features may also be adopted in combination.

When it is not necessary to distinguish between the first and second polarizing glass sheets, in other words, when the first polarizing glass sheet and the second polarizing glass sheet can be distinguished from each other by any means other than the cutout portion, the features of the cutout portions between the first and second polarizing glass sheets may be the same.

In the polarizing glass sheet set for an optical isolator of the present invention, when the first and second polarizing glass sheets are bonded to each other, the ratio of the area of a region in which the cutout portions are not present in both the polarizing glass sheets is preferably 94% or more, more preferably 98% or more, particularly preferably 99% or more with respect to the entire area. A region in which the cutout portion is present in at least one of the polarizing glass sheets cannot be used for manufacturing an optical element for an optical isolator. Therefore, as the area of a region in which the cutout portion is not present in both the first and second polarizing glass sheets becomes smaller, the manufacturing yield of the optical element for an optical isolator decreases. Thus, it is desired that the area of a region in which the cutout portion is not present be set to be maximized as long as a range required for the distinction can be left.

A method of manufacturing an optical element base material for an optical isolator of the present invention comprises a preparation step, a bonding step, and a cutting step.

In the preparation step, a first polarizing glass sheet and a second polarizing glass sheet, which are processed to have substantially the same shape and substantially the same dimensions, and a Faraday rotator are prepared. As the first and/or second polarizing glass sheet, a polarizing glass sheet having a cutout portion is used. The polarizing glass sheet having a cutout portion is as described above, and hence the description thereof is omitted here. Further, a method of manufacturing a polarizing glass sheet is described later.

Figure 8:
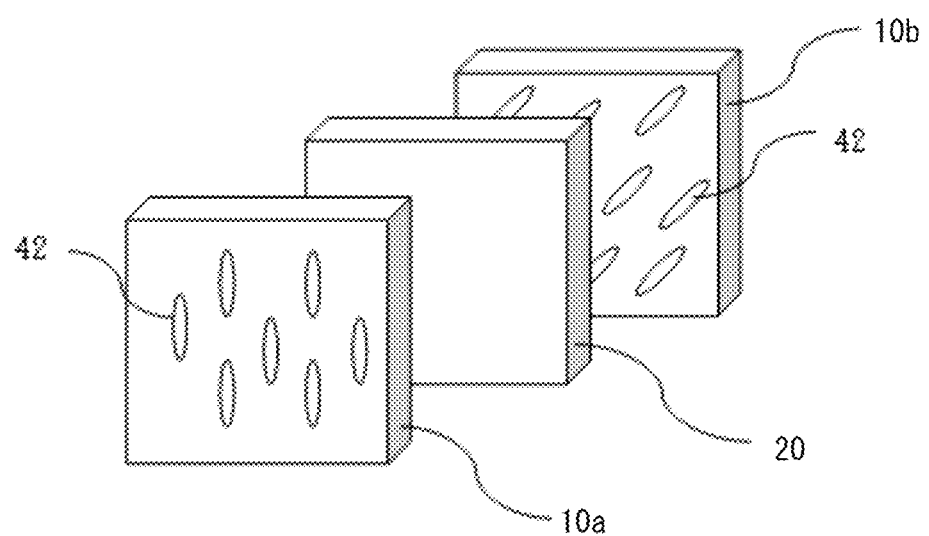
FIG. 8 is a schematic perspective view for illustrating a method of manufacturing an optical element base material for an optical isolator.

In the bonding step, as illustrated in FIG. 8, a first polarizing glass sheet 10*a* and a second polarizing glass sheet 10*b* are bonded to each other so as to hold a Faraday rotator 20 therebetween, to thereby manufacture the optical base material for an optical isolator. In FIG. 8, there are illustrated stretched metal particles 42. The description of the cutout portion is omitted. In order to enhance the performance of the optical isolator, a plurality of Faraday rotators and three or more polarizing glass sheets may be alternately stacked to manufacture an optical base material for an optical isolator. In the bonding step, it is extremely important to distinguish between the front and the back of each polarizing glass sheet, distinguish between the first and second polarizing glass sheets, and bond the first and second polarizing glass sheets to the Faraday rotator so that the polarizing glass sheets are aligned in proper directions and arranged properly. In view of the foregoing, in the present invention, the presence or absence of the cutout portion of the polarizing glass sheet, and the shape, dimensions, cutout position, number, and the like of cutout portions can be utilized for the above-mentioned distinction.

In the cutting step, the optical isolator base material obtained in the bonding step is cut to predetermined dimensions (e.g., from 0.3 mm square to 2.0 mm square). Thus, the optical element for an optical isolator can be obtained.

Next, a preferred method of manufacturing a polarizing glass sheet to be used in the present invention is described.

(Preparation of Glass Preform Sheet)

The same method and conditions as those of the first aspect of the present invention can be employed.

(Down-drawing of Glass Preform Sheet)

The same method and conditions as those of the first aspect of the present invention can be employed.

(Reduction of Glass Member)

Figure 9:
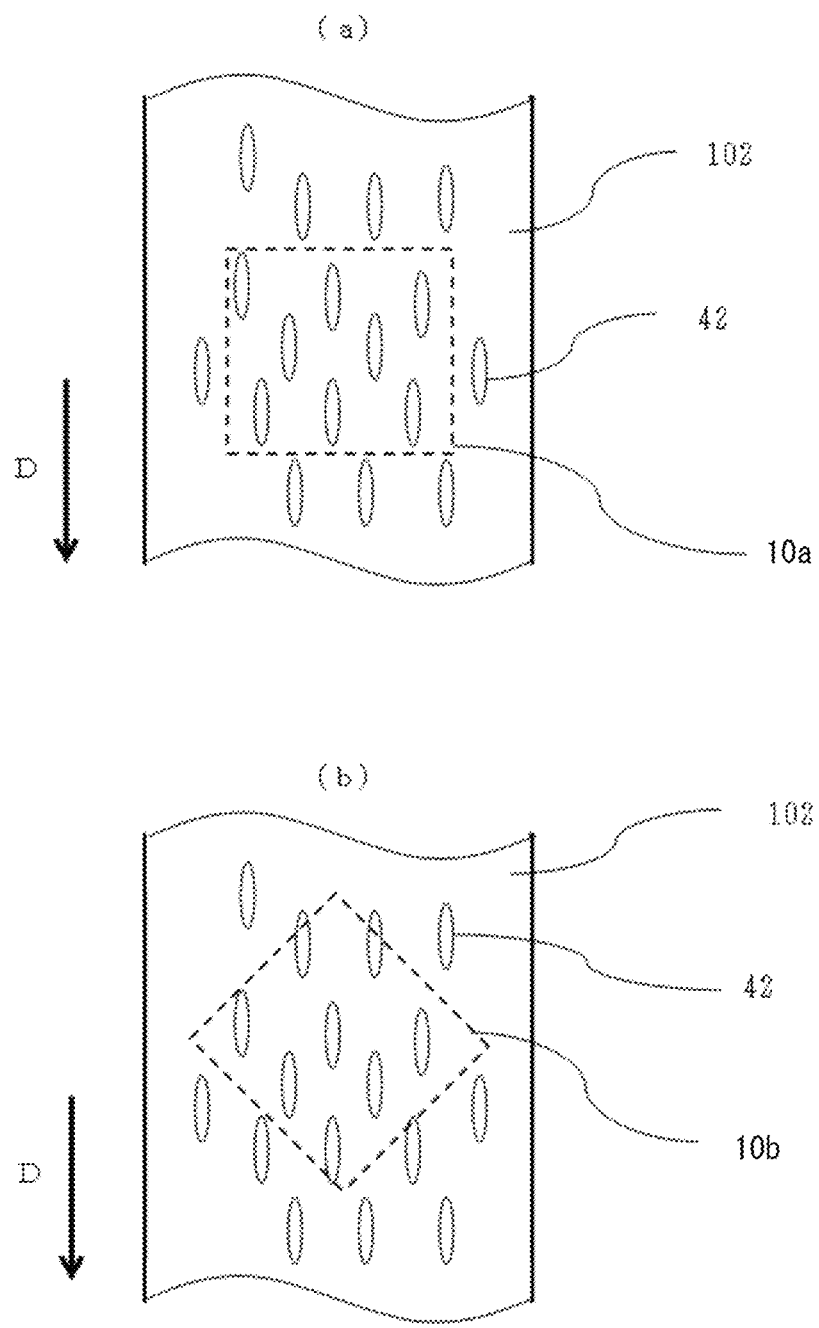
FIG. 9A is an explanatory view for illustrating a cutout direction of a polarizing glass sheet.
FIG. 9B is an explanatory view for illustrating a cutout direction of a polarizing glass sheet.

The same method and conditions as those of the first aspect of the present invention can be employed. As illustrated in FIG. 9A, the first polarizing glass sheet 10a can be obtained by cutting a glass member into a rectangular shape having a side parallel to the down-drawing direction D. Further, as illustrated in FIG. 9B, the second polarizing glass sheet 10b can be obtained by cutting a glass member into a rectangular shape having a side that forms an angle of 45° with respect to the down-drawing direction D. In FIG. 9A and FIG. 9B, there are illustrated a glass member 102 after the reduction treatment and the stretched metal particles 42.

Further, as necessary, a functional film, such as a reflection preventing film formed of a dielectric multi-layer film, may be formed on the surface of the cut polarizing glass sheet.

(Polarizing Glass Sheet)

The dimensions and thickness of the polarizing glass sheet are the same as those of the first aspect of the present invention.

In a direction perpendicular to the down-drawing direction D, the angle variation (polarizing axis deviation) of the stretched metal particles at the width of 8 mm of the polarizing glass sheet falls within preferably 0.01°/mm, more preferably 0.008°/mm, still more preferably 0.007°/mm, particularly preferably 0.005°/mm. When the polarizing axis deviation of the polarizing glass sheet is excessively large, the extinction ratio variation in the polarizing glass sheet surface is liable to increase, and a yield is liable to decrease.

The extinction ratio and the in-plane variation of the extinction ratio of the polarizing glass sheet are the same as those of the first aspect of the present invention.

(Formation of Cutout Portion)

One or more cutout portions are formed in the polarizing glass sheet obtained as described above. The shape, dimensions, cutout position, number, and the like of the cutout portions are as described above, and hence the description thereof is omitted here. The cutout portion can be formed by various methods such as a dicer, a laser, etching, a core drill, and sand blasting.

EXAMPLES

Now, a method of manufacturing a polarizing glass sheet according to the first aspect of the present invention is described by way of Examples. However, the present invention is not limited to Examples below. Further, the polarizing glass sheet manufactured here can be preferably used for manufacturing a polarizing glass sheet, a polarizing optical glass sheet set for an optical isolator, and an optical element for an optical isolator according to the second aspect.

Examples and Comparative Examples in the present invention are shown in Table 1.

TABLE 1

|  |  |  | Example 1 | Example 2 | Comparative Example 1 | Comparative Example 2 |
|---|---|---|---|---|---|---|
| Length $L_1$ (mm) of softened and deformed portion $S_1$ | | | 140 | 186 | 73 | 61 |
| Length $L_2$ (mm) of softened and deformed portion $S_2$ | | | 48 | 64 | 36 | 22 |
| Length $W_1$ (mm) equivalent to 0.5 times width of glass preform sheet | | | 85 | 90 | 75 | 65 |
| $L_1/W_1$ | | | 1.65 | 2.07 | 0.97 | 0.94 |
| $L_2/W_1$ | | | 0.56 | 0.71 | 0.48 | 0.34 |
| Length (mm) of heat-generating portion | | | 400 | 400 | 250 | 150 |
| Polarizing axis deviation (°/mm) | | | 0.0060 | 0.0050 | 0.0125 | 0.0225 |
| Extinction ratio (dB) | 1,310 nm | P0 | 50 | 48 | 46 | 42 |
| | | P1 | 40 | 43 | 32 | 31 |
| | | P2 | 42 | 42 | 37 | 26 |
| | | In-plane variation | ±5 | ±3 | ±7 | ±8 |
| | 1,550 nm | P0 | 54 | 55 | 47 | 41 |
| | | P1 | 61 | 61 | 61 | 55 |
| | | P2 | 62 | 60 | 58 | 52 |
| | | In-plane variation | ±4 | ±3 | ±7 | ±7 |

Each sample was manufactured and evaluated as described below.

(a) Manufacturing of Glass Preform Sheet

A raw material batch was prepared so as to provide borosilicate glass (softening point: 650° C.) containing, in terms of mass %, 60% of $SiO_2$, 18% of $B_2O_3$, 8.5% of $Al_2O_3$, 2% of $Li_2O$, 2.5% of $Na_2O$, 9% of $K_2O$, 0.3% of Ag, and 0.5% of Cl. The raw material batch was melted and formed into a sheet shape. The sheet-shaped glass was subjected to heat treatment at 675° C. for 2 hours, to thereby precipitate silver chloride particles in the glass. Then, the sheet-shaped glass was processed to provide a glass preform sheet having a width of 170 mm and a thickness of 5 mm.

(b) Down-drawing Step of Glass Preform Sheet

The glass preform sheet was subjected to down-drawing while being heated in the vicinity of temperature corresponding to a viscosity of $10^9$ dPa·s through use of an apparatus corresponding to FIG. 1, to thereby provide a glass member (width: 17 mm) having stretched silver chloride particles dispersed in an aligned manner in a glass matrix. Down-drawing conditions are shown in Table 1.

(c) Reduction Treatment Step of Glass Member

The glass member obtained as described above was polished so as to have a thickness of 0.2 mm and then was subjected to reduction treatment in a hydrogen atmosphere at 450° C. for 24 hours. As a result, the stretched silver chloride particles present in a surface layer of the glass member were reduced to provide stretched silver particles.

After that, the glass member was cut into a piece measuring 10 mm square, to thereby provide a polarizing glass sheet.

(d) Evaluation of Characteristics of Polarizing Glass Sheet

Figure 2:
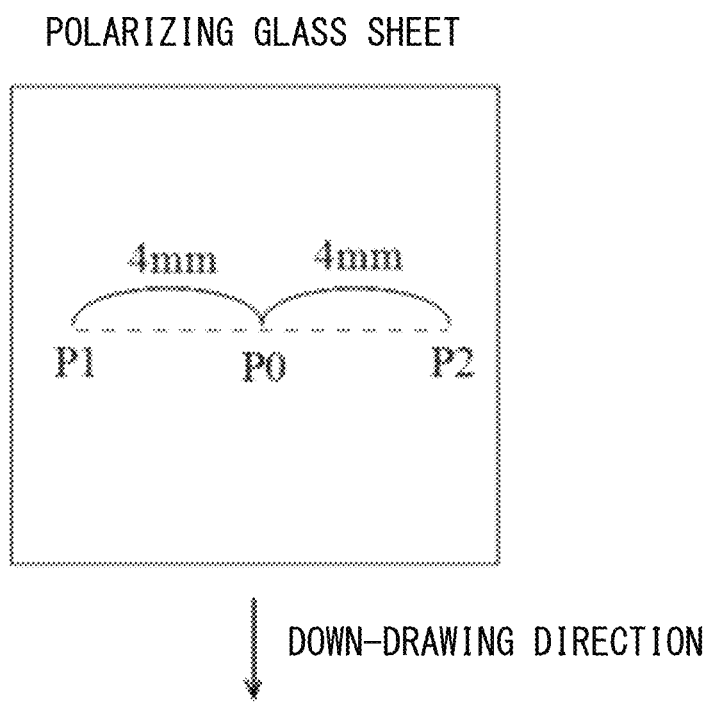
FIG. 2 is a schematic plan view of a polarizing glass sheet for illustrating a measurement method for polarizing axis deviation and an extinction ratio in Examples.

The polarizing axis deviation and the extinction ratio in the polarizing glass sheet were measured as described below. FIG. 2 is a schematic plan view of a polarizing glass sheet for illustrating a measurement method for each characteristic. P0 represents the center of the polarizing glass sheet, and P1 and P2 respectively represent positions 4 mm away from P0 to the left and right in a direction perpendicular to the down-drawing direction.

The polarizing glass sheet was placed on a rotary stage, and oscillation light from an near-infrared range wavelength oscillation laser (wavelength: 1,310 nm and 1,550 nm) was converted into linearly polarized light through a Glan-Thompson prism and radiated to P0, P1, and P2. The intensity of the near-infrared light having been transmitted through the polarizing glass sheet was measured through use of an optical power meter while the rotary stage was rotated around each measurement point. Angles at which the measured light intensity became maximum and minimum were read.

The characteristics of the polarizing glass sheet were evaluated under the condition that, at P1 and P2, an angle at which the light intensity became minimum was defined as a polarizing axis angle (angle of stretched silver particles) at each position, and a value obtained by dividing the difference between the polarizing axis angles by 8 mm was defined as the polarizing axis deviation.

At P0, P1, and P2, the ratio between the maximum value and the minimum value of the light intensity (corresponding to the ratio between the maximum value and the minimum value of a transmitted light quantity) was determined, and the extinction ratio was calculated by the expression (2). The in-plane variation of the extinction ratio was determined by the following expression (4).

In-plane variation=±(Maximum value of extinction ratio-minimum value of extinction ratio)/2　　(4)

As is apparent from Table 1, in Examples 1 and 2, in the down-drawing step of the glass preform sheet, the length ($L_1/W_1$) of the softened and deformed portion $S_1$ of the glass preform sheet with respect to the length equivalent to 0.5 times that of the glass preform sheet was as large as 1.65 or more, and the length ($L_2/W_1$) of the softened and deformed portion $S_2$ of the glass preform sheet with respect to the length equivalent to 0.5 times that of the glass preform sheet was as large as 0.56 or more. Therefore, the polarizing axis deviation of the polarizing glass sheet was as small as 0.0060°/mm or less at the width of 8 mm. Further, the in-plane variation of the extinction ratio was as small as within ±5 dB. Meanwhile, in Comparative Examples 1 and 2, $L_1/W_1$ was as small as 0.97 or less, and $L_2/W_1$ was as small as 0.48 or less. Therefore, the polarizing axis deviation of the polarizing glass sheet was as large as 0.0125°/mm or more at the width of 8 mm. Further, the in-plane variation of the extinction ratio was as large as ±7 dB or more, and the value of the extinction ratio was less than 40 dB in a part of the surface.

REFERENCE SIGNS LIST 1 glass preform sheet
2 heat-generating element
3 tension roller
4 metal halide particle
4' stretched metal halide particle
5 glass member
10 polarizing glass sheet
10a first polarizing glass sheet
10b second polarizing glass sheet
20 Faraday rotator
11, 12, 13, 14, 15, 16, 17 cutout portion
102 glass member after reduction treatment
42 stretched metal particle

The invention claimed is:

1. A method of manufacturing a polarizing glass sheet having stretched metal particles dispersed in an aligned manner in a glass matrix, the method comprising:
a down-drawing step of subjecting, while heating, a glass preform sheet having an original width $W_0$ and containing metal halide particles to down-drawing, to thereby provide a glass member having stretched metal halide particles dispersed in an aligned manner in a glass matrix and having a width of 0.2 times the original width $W_0$ or less; and
a reduction step of subjecting the glass member to reduction treatment to reduce the stretched metal halide particles, to thereby provide a polarizing glass sheet,
the down-drawing step of the glass preform sheet comprising subjecting, while heating, the glass preform sheet to down-drawing so that a shape of the glass preform sheet during the down-drawing satisfies a relationship of the following expression (1):

$$L_1/W_1 \geq 1.0 \tag{1}$$

where $L_1$ represents a length between a portion in which a width of the glass preform sheet has changed to 0.8 times the original width $W_0$ and a portion in which the width of the glass preform sheet has changed to 0.2 times the original width $W_0$, and $W_1$ represents a value equivalent to 0.5 times the original width $W_0$ of the glass preform sheet.

2. The method of manufacturing a polarizing glass sheet according to claim 1, wherein $L_1$ in the expression (1) has a value of 60 mm or more.

3. The method of manufacturing a polarizing glass sheet according to claim 1, wherein the original width $W_0$ of the glass preform sheet is 100 mm or more.

4. The method of manufacturing a polarizing glass sheet according to claim 1, wherein the heating of the glass preform sheet is performed so that a viscosity of the glass preform sheet falls within a range of from $10^7$ dPa·s to $10^{11}$ dPa·s between the portion in which the width of the glass preform sheet during the down-drawing has changed to 0.8 times the original width $W_0$ and the portion in which the width of the glass preform sheet during the down-drawing has changed to 0.2 times the original width $W_0$.

5. The method of manufacturing a polarizing glass sheet according to claim 1, wherein the metal comprises silver or copper.

6. A method of manufacturing a polarizing glass sheet having stretched metal particles dispersed in an aligned manner in a glass matrix, the method comprising:
a down-drawing step of subjecting, while heating, a glass preform sheet having an original width $W_0$ and containing metal halide particles to down-drawing, to thereby provide a glass member having stretched metal halide particles dispersed in an aligned manner in a glass matrix and having a width of 0.5 times the original width $W_0$ or less; and
a reduction step of subjecting the glass member to reduction treatment to reduce the stretched metal halide particles, to thereby provide a polarizing glass sheet, the down-drawing step of the glass preform sheet comprising subjecting, while heating, the glass preform sheet to down-drawing so that a shape of the glass preform sheet during the down-drawing satisfies a relationship of the following expression (2):

$$L_2/W_1 \geq 0.5 \quad (2)$$

where $L_2$ represents a length between a portion in which a width of the glass preform sheet has changed to 0.8 times the original width $W_0$ and a portion in which the width of the glass preform sheet has changed to 0.5 times the original width $W_0$, and $W_1$ represents a value equivalent to 0.5 times the original width $W_0$ of the glass preform sheet.

7. The method of manufacturing a polarizing glass sheet according to claim 6, wherein $L_2$ in the expression (2) has a value of 30 mm or more.

8. The method of manufacturing a polarizing glass sheet according to claim 6, wherein the original width $W_0$ of the glass preform sheet is 100 mm or more.

9. The method of manufacturing a polarizing glass sheet according to claim 6, wherein the heating of the glass preform sheet is performed so that a viscosity of the glass preform sheet falls within a range of from $10^7$ dPa·s to $10^{11}$ dPa·s between the portion in which the width of the glass preform sheet during the down-drawing has changed to 0.8 times the original width $W_0$ and the portion in which the width of the glass preform sheet during the down-drawing has changed to 0.2 times the original width $W_0$.

10. The method of manufacturing a polarizing glass sheet according to claim 6, wherein the metal comprises silver or copper.

\* \* \* \* \*